US010653134B2

(12) United States Patent
Shukla et al.

(10) Patent No.: US 10,653,134 B2
(45) Date of Patent: May 19, 2020

(54) MICROCAPSULE COMPOSITION CONTAINING WATER-SOLUBLE AMINE AND A PROCESS FOR THE PREPARATION THEREOF

(71) Applicant: Council of Scientific and Industrial Research, New Delhi (IN)

(72) Inventors: Parshuram Gajanan Shukla, Pune (IN); Arun Savalaram Jadhav, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 33 days.

(21) Appl. No.: 15/526,280

(22) PCT Filed: Nov. 10, 2015

(86) PCT No.: PCT/IN2015/050162
§ 371 (c)(1),
(2) Date: May 11, 2017

(87) PCT Pub. No.: WO2016/075708
PCT Pub. Date: May 19, 2016

(65) Prior Publication Data
US 2017/0325448 A1    Nov. 16, 2017

(30) Foreign Application Priority Data
Nov. 11, 2014  (IN)  ............................. 3250/DEL/2014

(51) Int. Cl.
*A01N 25/28* (2006.01)
*A01N 33/04* (2006.01)
(Continued)

(52) U.S. Cl.
CPC ............ *A01N 25/28* (2013.01); *A01N 33/04* (2013.01); *A01N 33/08* (2013.01); *A01N 43/40* (2013.01)

(58) Field of Classification Search
None
See application file for complete search history.

(56) References Cited

U.S. PATENT DOCUMENTS

| 4,517,141 A | 5/1985 | Dahm et al. |
| 4,592,957 A | 6/1986 | Dahm et al. |

(Continued)

FOREIGN PATENT DOCUMENTS

| EP | 0590975 | 4/1994 |
| JP | 2004008015 | 1/2004 |

(Continued)

OTHER PUBLICATIONS

McIlroy et al. (Microencapsulation of a Reactive Liquid-Phase Amine for Self-Healing Epoxy Composites, 2010) (Year: 2010).*

(Continued)

*Primary Examiner* — Robert A Wax
*Assistant Examiner* — Quanglong N Truong
(74) *Attorney, Agent, or Firm* — Schwegman Lundberg & Woessner, P.A.

(57) ABSTRACT

Disclosed herein is a stable, encapsulated reactive amine composition, having a particle size about 100 microns or less comprising; water soluble amine; polymeric surfactant/stabilizer; polyisocynate; and fumed silica; wherein, the reactive amine is released from the encapsulated amine in aqueous and non-aqueous environment, for use in industries such as painting, cosmetics, paper, lubricants, printing, plastics, petrochemicals etc. Further, the invention provides process for the preparation of stable microcapsule compo- (Continued)

sition, without converting the water soluble amine into its salt or adduct and its characterization thereof.

9 Claims, 1 Drawing Sheet

(51) Int. Cl.
*A01N 33/08* (2006.01)
*A01N 43/40* (2006.01)

(56) References Cited

U.S. PATENT DOCUMENTS

| | | | |
|---|---|---|---|
| 4,729,792 A | 3/1988 | Seitz et al. | |
| 4,746,513 A * | 5/1988 | Smith | A01N 25/28 264/4 |
| 4,940,645 A | 7/1990 | Davis et al. | |
| 5,191,012 A | 3/1993 | Markusch et al. | |
| 5,401,505 A | 3/1995 | Duell et al. | |
| 5,726,222 A | 3/1998 | Sawaoka et al. | |
| 5,849,412 A | 12/1998 | Bromberg et al. | |
| 5,922,652 A | 7/1999 | Kowalski et al. | |
| 5,962,003 A | 10/1999 | Shukla et al. | |
| 6,489,405 B1 | 12/2002 | Beisele | |
| 6,506,397 B1 * | 1/2003 | Thies | A01N 25/28 424/408 |
| 8,318,060 B2 | 11/2012 | Sundberg et al. | |
| 2003/0165682 A1 | 9/2003 | Menting et al. | |
| 2005/0160662 A1 | 7/2005 | Jordan | |
| 2006/0251688 A1 * | 11/2006 | Gajanan | A61K 8/11 424/401 |
| 2007/0053950 A1 | 3/2007 | Gajanan et al. | |
| 2008/0039551 A1 | 2/2008 | Bigorra Llosas et al. | |
| 2010/0119679 A1 * | 5/2010 | Dihora | B01J 13/16 426/534 |
| 2013/0109569 A1 * | 5/2013 | Dave | B01J 13/16 504/130 |
| 2014/0017307 A1 | 1/2014 | Marzouk et al. | |

FOREIGN PATENT DOCUMENTS

| | | |
|---|---|---|
| WO | WO-1998057737 | 12/1998 |
| WO | WO-2003031540 | 4/2003 |
| WO | WO-2007081350 | 7/2007 |
| WO | WO-2008127423 | 10/2008 |
| WO | WO-2013101889 | 7/2013 |
| WO | WO-2016075708 | 5/2016 |

OTHER PUBLICATIONS

"International Application No. PCT/IN2015/050162, Article 19 Amendments filed May 4, 2016", (May 4, 2016), 14 pgs.
"International Application No. PCT/IN2015/050162, International Search Report and Written Opinion dated Mar. 14, 2016", (Mar. 14, 2016), 8 pgs.
Fonseca, C., et al., "Microencapsulation of Trioctylamine in Polymeric Matrices for Removing Zn(II) and Cu(II) From Chloride Aqueous Solutions", J. Chil. Chem. Soc., 55, No. 3 (2010), 408-414, (Jul. 15, 2010), 408-414.
Jadhav, Rajendra S., et al., "Synthesis of multicore phenol formaldehyde microcapsules and their application in polyurethane paint formulation for self-healing anticorrosive coating", International Journal of Industrial Chemistry 2013, 4:31, (May 11, 2013), 9 pgs.
Liao, Leping, et al., "Preparation and characterization of microcapsule containing epoxy resin and its self-healing performance of anticorrosion covering material", Chinese Science Bulletin, vol. 56, Nos. 4-5 (2011), 439-443, (Feb. 2011), 439-443.
McIlroy, David A., "Microencapsulation of Polyfunctional Amines for Self-Healing of Epoxy-Based Composites", Polymer Preprints 2008, 49(1),963, (2008), 963-964.
Tiwari, Shashank, et al., "Microencapsulation technique by solvent evaporation method (Study of effect of process variables)", International Journal of Pharmacy & Life Sciences, 2(8) (2011); 998-1005, (Aug. 2011), 998-1005.
Fang, Wang, et al., "Study on curing kinetics of a diglycidyl ether of bisphenol A epoxy resin/microencapsulated curing agent system", *High Performance Polymers*, 24(8), (2012), 730-737.
Hu, Jian-Qing, et al., "Synthesis and characterization of polyfunctional aziridine/polyester microcapsules by multiple emulsion-solvent evaporation method", University of Technology, 18(2), (Apr. 2011), *Journal of Central South University of Technology*, 18(2), (Apr. 2011), 337-342.
Jin, Henghua, et al., "Self-healing thermoset using encapsulated epoxy-amine healing chemistry", *Polymer*, 53(2), (2012), 581-587.
Kobašlija, Muris, et al., "Polyurea Microcapsules from Oil-in-Oil Emulsions via Interfacial Polymerization", *Macromolecules*, 39(19), (2006), 6371-6375.
Li, Jun, et al., "Pickering-Emulsion-Templated Encapsulation of a Hydrophilic Amine and Its Enhanced Stability Using Poly(allyl amine)", *ACS Macro Lett.*, 3 (10), (2014), 976-980.
Li, Qi, et al., "Effects of dual component microcapsules of resin and curing agent on the self-healing efficiency of epoxy", *Composites Part B: Engineering*, vol. 55, Dec. 2013, pp. 79-85, (Jun. 15, 2013), 79-85.
Longstreet, Ashley R., et al., "Organic Reaction Systems: Using Microcapsules and Microreactors to Perform Chemical Synthesis", *Acc. Chem. Res.*, 46(2), (2013), 327-338.
McIlroy, David A., et al., "Microencapsulation of a Reactive Liquid-Phase Amine for Self-Healing Epoxy Composites", *Macromolecules*, 43(4), (2010), 1855-1859.
Poe, Sarah L., et al., "Mechanism and Application of a Microcapsule Enabled Multicatalyst Reaction", *J. Am. Chem. Soc.*, 129(29), (2007), 9216-9221.

* cited by examiner

MICROCAPSULE COMPOSITION CONTAINING WATER-SOLUBLE AMINE AND A PROCESS FOR THE PREPARATION THEREOF

PRIORITY CLAIM TO RELATED APPLICATIONS

This application is a U.S. national stage application filed under 35 U.S.C. § 371 from International Application Ser. No. PCT/IN2015/050162, which was filed 10 Nov. 2015, and published as WO2016/075708 on 19 May 2016, and which claims priority to India Application No. 3250/DEL/2014, filed 11 Nov. 2014, which applications and publication are incorporated by reference as if reproduced herein and made a part hereof in their entirety, and the benefit of priority of each of which is claimed herein.

The following specification particularly describes the invention and the manner in which it is to be performed.

FIELD OF THE INVENTION

The present invention relates to microcapsule composition containing water-soluble amine and a process for the preparation thereof. Particularly, present invention relates to a stable microcapsule composition comprising encapsulated reactive agent selected from water soluble amine, wherein the said reactive agent(s) acts as both an active ingredient as well as a microcapsule wall forming agent. More particularly, present invention provides a process for the preparation of stable microcapsule composition, without converting the water soluble amine into its salt or adduct.

Additionally the microcapsules thus prepared may be used in industries such as painting, cosmetics, paper, lubricants, printing, plastics, petrochemicals, agriculture, coating etc.

BACKGROUND OF THE INVENTION

Microencapsulation is a process by which small, tiny solid particles, liquid droplets, or gas bubbles are surrounded or coated with a continuous film of polymeric material. The core of the microcapsule can also be referred as active agent, active core, core material, fill, internal phase, nucleus, and payload and the coating material used to coat the outer surface of the microcapsule is also called as coating, membrane, shell or wall. The coating material may be selected from the group consisting of organic polymer, hydrocolloid, sugar, wax, metal, or inorganic oxide. Microencapsulated substances may resolve many problems in various industries which are often having unnoticeable limitations like high reactivity, high volatility, pressure sensitivity, fast releasing, environmental and human toxicity, solubility and oxygen sensitivity which can be easily eliminated by incorporating microencapsulated additives.

Microencapsulation of amine can solve many problems faced in above applications. From the point of formulation and use, coating material can be hot melt, solvent based, emulsion based (usually aqueous), or pressure sensitive. However some high performance coatings such as epoxy resin consists of two chemical species which react upon mixing. As a result, they need to be packaged in two separate containers.

Having such coating formulation in two separate containers and then mixing them in a proper way and material ratio, is a problem for paint companies and also for the applicator which can be overcome by microencapsulating one of the reacting components and mixing these microcapsules in desired composition with the other reacting component formulation. One of such component is polymeric amine or termed as polyamine which has at least two amine functionality. Polyfunctional amines form an important class of epoxy hardeners.

U.S. Pat. No. 6,489,405 describe such epoxy composition wherein epoxy hardener (polyoxypropylenediamine:diethylenetriamine 95:5) 60 parts is mixed with 100 parts by weight of epoxy resin and cured for 3 hours at 80° C. Microcapsules containing reactive amine are found to be effective in self-healing epoxy composites ((Polymer Preprints, 2008, 49(1), p 963, Macromolecules, 2010, 43, p 1855-1859).

Microcapsules containing trioctylamine are useful in removing Zn(II) and Cu(II) from chloride aqueous solutions (Fonseca C. et al; J. Chilean Chem. Soc. 2010, 55, p 408).

The use of microcapsules in coating materials such as paint is well known in the literature. (Joaquln et al, US 2008/0039551; Jadhav et al, Int. J. Indust. Chem., 2013, 4, p 31; Shukla et al, US 2007/0053950; Pigment & Resin Technology, 1998, 17(4)).

Pressure sensitive microcapsules containing curing agent find applications to produce one pack system. (Wang et al, High Performance Polymers, 2012, 24(8), p 730; Liao et al, Chinese Sci. Bull., 2011, 56, p 439; Ryuji et al, U.S. Pat. No. 5,726,222). Though literature describing use of microcapsules containing amine is available, it is restricted to water-insoluble amine and/or amine-adduct.

Water soluble amines find applications in various fields as listed at http://www.dow.com/amines/apps/ viz. adhesives, agriculture, asphalt additives, bleach activator, cement, chelating agents, coatings, surfactants, textile/textile additives, urethane chemicals/foams and wood treating detergents/cleaner/fabric, drainage aids, epoxy curing agents, fungicides, gas treating, hydrocarbon purification, ion exchange resins, papers, paper wet strength resins, petroleum chemicals, pharmaceuticals, personal care, photographic chemicals, printing inks (U.S. Pat. No. 4,729,792), rubber/rubber processing aids (US20030165682), corrosion inhibitors (U.S. Pat. No. 5,922,652) diagnostics (U.S. Pat. No. 4,940,645), softeners, (US 20140017307), Fuel/lube oil additives (US 2005/0160662) etc.

One of the water soluble amine is polyaziridine having carboxylic acid functionality. It has applications in coatings, ink and adhesives to promote physical and chemical properties. However, polyaziridines have drawback of limited pot life in water due to reactive aziridine rings.

There is need to have pressure sensitive microcapsules containing water-soluble amine which are useful in applications such as laundry, agriculture, pharmaceuticals, cosmetics, construction materials, food, coating materials and other uses as listed above. In the past, there have been attempts to prepare microcapsules containing water soluble substances and amines. However these water soluble substances are not reactive compounds such as amines. There are reports in the literature which describe only microencapsulation of water-insoluble amines. Some reports mention the need of converting water-soluble amine to its derivative such as salt or adduct which becomes water-insoluble and then follow the encapsulation. When such amines (in salt or adduct form) are released, will need some external trigger to convert these amine derivatives to neat amine. Interfacial or dispersion polymerization is considered as industrially feasible microencapsulation process.

Other microencapsulation processes involve spray drying, solvent evaporation etc. However such processes involve use of large amount of solvents and/or multiple emulsions and thus are not suitable for making microcapsules which are intended to be used in various applications like adhesives, self-healing composites, agriculture, pharmaceuticals etc.

U.S. Pat. No. 5,401,505 (Bradley et al) describes preparation of microcapsules by interfacial polymerization, wherein aziridine is used as wall forming monomer and not as a core material (liquid fill). Bradley et al mentions that the fill (core material) within microcapsules will be a hydrophobic or hydrophilic liquid or solid wherein the invention has drawbacks such as use of sulfuric acid to protonate aziridine, large particle size 500 to 2300 microns and release of water along with hydrophilic core material.

U.S. Pat. No. 8,318,060 (Donal et al.) teaches conversion of amine to amine adduct which is water in-soluble then microencapsulated by free radical polymerization in aqueous medium. However the process does not describe microcapsule containing neat water soluble amine.

David et al (Polymer Preprints, 2008, 49(1), p 963, Macromolecules, 2010, 43, p 1855-1859) describe microencapsulation of polyfunctional amine. i.e. DEH-52 which is a diethylenetriamine (DETA) adduct of DGEBA (diglycidyl ether of bisphenol A) and excess DETA. Jun et al (ACS Macro Lett. 2014, 3, 976-980) reported encapsulation of tetraethylenepentamine by an emulsion-templated in situ polymerization using inverse Pickering emulsion. However, the resultant microcapsules encapsulate tetraethylenepentamine along with water. Thus these articles do not teach encapsulation of neat amine. Henghua et al. (Polymer, 2012, 53(2) p 581-587) have reported microcapsules containing aliphatic polyamine (EPIKURE 3274) which are prepared, first by preparing hollow urea-formaldehyde microcapsules (with 9-18% yield) which are then loaded with amine by vacuum infiltration for several hours. Thus the process involves two steps and produce microcapsules having an average diameter of 117±32 microns.

Hu, Jian-qing et al (Journal of Central South University of Technology, 18, (2) p-337-342) and JP 2004008015 described manufacture of microcapsules containing water soluble substances such as polyfunctional aziridine. However the drawback of this method is that microcapsules are prepared by multiple emulsion-solvent evaporation method and thus very less core content of ~22% is achieved and that any traces of solvent in microcapsules are not acceptable when microcapsules are intended to be used in coating application. Further Japanese patent JP 03182520A teaches preparation of microcapsules containing amine curing agents having water solubility less than 10%. Thus amines which are freely soluble in water cannot be encapsulated by the method described.

U.S. Pat. No. 5,962,003 (Shukla et al.) have reported preparation of microcapsules containing water-soluble pesticide using polyurethane as wall material. The process involves interfacial reaction between diol and diisocyanate. When amine is to be used as core material the process would involve first emulsion of mixture of amine and diol in aliphatic hydrocarbon followed by addition of diisocyanate. In this case as reactivity of isocyanate (NCO) with amine is more than that with OH group of diol and the reaction between amine and NCO would also take place and microcapsules would contain mixture of diol and amine. When this process was followed to microencapsulate polyaziridine it resulted in irregular particles in the range of 20 to 300 microns.

Nishijima et al. (JP 48076935) discloses process for the preparation of microcapsules containing amine curing agent involving water as continuous phase. The process involves emulsifying amine and organic solvent solution in water followed by addition of water-soluble epoxy compound, the said process is carried out in aqueous phase and there are great chances of organic solvent being encapsulated in microcapsules along with amine.

U.S. Pat. Nos. 4,592,957 and 4,517,141 (Dahm et al) relates to microcapsules having a hydrophobic core and capsule walls formed by the reaction of water-soluble polyisocyanate bisulphite adduct with water-insoluble polyamines. Diethyl tolylene diamine (dye-precursor), which is water-insoluble amine, is used as core (liquid fill) and also wall forming monomer.

Further, WO 98/57737 teaches a method for microencapsulating water-soluble or water-dispersible or water-sensitive material, which is particularly useful for encapsulating breaker materials which are employed to break fracturing fluids. The method involves use of toluene in continuous phase. As amines such as polyaziridine, DETA and TETA are miscible in toluene, water-soluble amines cannot be encapsulated by WO'737 method.

U.S. Pat. No. 6,489,405 describe epoxy composition, wherein epoxy hardener (polyoxypropylenediamine:diethylenetriamine 95:5) 60 parts is mixed with 100 parts by weight of epoxy resin and cured for 3 hours at 80° C. EP 0590975 A1 describes one component type epoxy resin which is bisphenol A diglycidyl ether or bisphenol F diglycidyl ether, which comprises a) 100 parts by weight epoxy resin b) 5-100 parts by weight of a reactive diluent and c) 1-100 parts by weight of a latent curing agent, which is a microencapsulated amine.

Wang Fang et al describes preparation of microcapsules using polyetherimide as wall material by solvent evaporation technique. The microencapsulation process involves water as continuous phase and thus the process is not useful for preparation of microcapsules containing water soluble amine. (High Performance Polymers, 2012, 24(8), p 730).

Microcapsules containing reactive amine are found to be effective in self-healing epoxy composites ((Polymer Preprints, 2008, 49(1), p 963; Macromolecules, 2010, 43, p 1855-1859).

U.S. Pat. No. 5,849,412 describes encapsulated gel network comprises non-aqueous reactive material selected from the group consisting of a polyol, an isocyanate, a multifunctional amine, an organometallic, an acrylate, an acid, an acid anhydride and an acyl halide and diisocyanates or polyisocyanates or mixtures thereof.

WO2007081350 describes an encapsulated colorant compositions having a high encapsulation efficiency, wherein capsule core comprising at least one colorant, and a capsule shell, comprises reaction products of: (a) at least one di-, oligo- and/or polyisocyanate, and (b) at least one polyfunctional amine selected from the group consisting of polyvinylamines, polyethylenimines and polyoxyalkylenamines; (c) optionally, one or more alkyldiamines having 2 to 10 carbon atoms. The average particle size of said encapsulate less than about 5 microns.

WO2013101889 discloses a composition with increased release comprising; an encapsulated active and one or more metal additive, wherein encapsulated active is an amine resin. Further the aqueous dispersion of the encapsulated active is between 0.1 micron and 80 micron.

U.S. Pat. No. 5,191,012 describes aqueous dispersion of an encapsulated polyisocyanate which contains unreacted isocyanate groups which is prepared by dispersing in water a polyisocyanate and reacting the dispersed polyisocyanate with a polyamine having primary and/or secondary amino groups and a molecular weight of 400 or less in an amount sufficient to provide an equivalent ratio of amino groups to isocyanate groups of at least 0.05:1.

It may also be noted that, Sam Popwell et al. in *Polymer Preprints* 2005, 46(1), 735 describes preparation and analysis of initiator-core polyurea microcapsules using pentamines and diamines as shell components, wherein the isocyanate to primary amine ratio affects the stability of polyurea shell microcapsules. Further the core solution comprises cumene hydroperoxide, polyfunctional isocyanates, polyvinyl alcohol solution, aqueous polyamine. The microcapsule formed is separated using fumed silica. The particle size of core is ranging from 150-300 micron in diameter.

Recently microcapsules containing chemical reagent have shown to be useful to perform chemical synthesis as reported in Accounts in Chemical Research, 46(2), 2013, p 327-338 by Ashley R. et al. In many chemical reactions reagent compatibility plays critical role when oxidants/reductants or nucleophile/electrophile steps are coupled together for example, amine catalyst and nickel complexes are known to be incompatible because of their tendency to chelate and deactivate each other. Because of the fact that most successful catalyst for the Henry elimination are amine and especially polyamine, Tyler et al. have studied microcapsules containing polyethyleneimine (PEI). They have demonstrated that two step reaction capable of converting both aromatic and aliphatic aldehydes to their corresponding Michael addition adduct in a single vessel is possible by use of microcapsules containing PEI (Sarah L. Poe, Murris Kobaslija and D. D. Tyler Mcquade, J Am Chem Soc., 129, 2007, p 9216-9221). Tyler et al have prepared these PEI microcapsules, wherein PEI is encapsulated as solution in methanol, dimethyl formamide (DMF) and formamide. The same authors have reported microcapsules containing coumarin-1 wherein PEI is used as wall forming monomer (Murris Kobaslija and D. D. Tyler Mcquade, Macromolecules, 39, 2006, p 6371-6375). In this report too when microcapsules are prepared by oil in oil emulsion, disperse phase contains solvents listed above (Methanol, DMF and Formamide). Also Coumarin-1 is sparingly soluble in water (WO 2008127423 A2). Thus they do not teach how to encapsulate water-soluble neat amine.

The prior art reveals that the preparation of amine microcapsules is accompanied by cumbersome process steps such as converting into an insoluble salt or adduct and then encapsulated, large particle size of microcapsule, less core content, release of water along with core material and instability etc. Further coating system employed in the art is usually a two pack system of epoxy and hardener, wherein encapsulation of water soluble amine is not addressed.

One of the water soluble amine is polyaziridine having carboxylic acid functionality. It has applications in ink and adhesives to promote physical and chemical properties. However, polyaziridines have drawback of limited pot life in water due to reactive aziridine rings.

Qi Li et al have described dual component microcapsules of epoxy resin and curing agent for self healing epoxy composite (Composites Part B, Vol 55, 2013, pp 79-85). They have prepared microcapsules containing DGEBA (diglycidyl ether of bisphenol A) epoxy resin and microcapsules containing water soluble amine namely polyetheramine. Microcapsules containing this amine are prepared by solvent evaporation method using poly(methylmethacrylate) as encapsulating polymer and using water as continuous phase. It has been reported and known that the major problem with this solvent evaporation technique is a poor encapsulation efficiency of moderately water soluble and water soluble substances which partitioned out from the organic disperse phase in to the aqueous continuous phase (Shashank Tiwari and Prerana Verma, Int. J. Pharm and Life Sci. Vol. 2(8), 2011, pp 998-1005). In the above said reference of Qi Li, though they planned 80% loading of polyether amine in the microcapsules, they could get microcapsules containing only 20% amine.

Thus the prior art fails to provide polymer microcapsules containing neat water-soluble polyamine with core loading more than 28% having particle size less than 100 microns, for use in coating application-like paints and a process, where these microcapsules are produced by in-situ polymerization method carried out in non-aqueous medium.

Thus the preparation of microcapsules containing water soluble substance by solvent evaporation method using water as aqueous phase is not a feasible process to get microcapsules with higher active loading (up to 80%) and with high yield. The inventors have explored this solvent evaporation method using w/o/w emulsion using water as continuous phase and also by o/o emulsion using non-aqueous (paraffin oil) continuous phase to achieve higher loading of amine and yield but the experiments resulted in very poor yield (20-50%), very low amine content (less than 1%) and/or big polymer lump.

Therefore, the present inventors have developed the one pack system of microcapsule composition containing water soluble neat amine with dual characteristics of active ingredient and microcapsule wall forming agent, along with polymeric surfactant/stabilizer; polyisocynate; fumed silica. Further the neat amine gets released in substantial quantity from the microcapsules without any formation of derivatives, salts and adduct thereof. Microcapsules containing water soluble amine of the present invention has potential application in self-healing composites, pesticides, asphalt additives, chelating agents, corrosion inhibitors, detergents, epoxy curing agents, fungicides, lube oil additives, papers, pharmaceuticals, personal care, photographic chemicals, printing inks, textile and as reagent in various chemical reactions etc. The microcapsule of the instant invention is a cost-effective process for preparation and finds industrial applicability.

OBJECTS OF THE INVENTION

Main object of the present invention is to provide microcapsule composition containing water-soluble amine.

Another object of the present invention is to provide a process for the preparation of microcapsules composition containing water-soluble amine.

Yet another object of the present invention is to provide microcapsule composition useful in industries such as painting, cosmetics, paper, lubricants, printing, plastics, petrochemicals, agriculture, coating etc.

SUMMARY OF THE INVENTION

Accordingly the present invention provides a microcapsule composition having a particle size in the range of 2-100 microns wherein the said composition comprising 28-90% w/w water soluble neat amine, 5-75% w/w polyurea and 5-25% w/w fumed silica.

In an embodiment of present invention, the water soluble amine is selected from monoamine or polyamine, wherein the monoamine is selected from the group consisting of monoethanolamine (MEA), triethanolamine (TEA), triisopropanolamine (TIPA), diisopropylamine (DIPA), N-methylethanolamine (NMEA), N-methyl diethanolamine (MDEA), monoisopropylamine (MIPA), 4-aminopyridine (4-AP), n-propyl amine, either alone or mixtures thereof, wherein the polyamine is selected from the group consisting of ethylene imine based tri-functional polyaziridine, propylene imine based tri-functional polyaziridine, diethylenetriamine (DETA), triethylenetetraamine (TETA), tetraethylene pentamine, 2,4,4'-triaminodiphenylether, bis(hexamethylene) triamine, ethylene diamine (EDA), trimethylenedipiperidine (TMDP), guanidine carbonate (GUCA), phenylene diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophorone diamine, diamino propane, diaminobutane, piperazine (PIP), aminoethylenepiperazine (AEP), poly (propylene glycol) bis (2-aminopropyl ether) or O,O'-bis(2-aminopropyl) polypropylene glycol-block-polyethylene glycol-block-poly propylene glycol;

In another embodiment of present invention, the composition optionally comprises 2-20% w/w second amine selected from the group consisting of ethylene imine based tri-functional polyaziridine, propylene imine based tri-functional polyaziridine, diethylenetriamine (DETA), triethylenetetraamine (TETA), tetraethylene pentamine, 2,4,4'-triaminodiphenylether, bis(hexamethylene) triamine, ethylene diamine (EDA), trimethylenedipiperidine (TMDP), 1,4,5,8-tetraamino anthraquinone, guanidine carbonate (GUCA), phenylene diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophorone diamine, diamino propane, diaminobutane, Poly (propylene glycol) bis (2-aminopropyl ether), O,O'-bis(2-aminopropyl) polypropylene glycol-block-polyethylene glycol-block-poly propylene glycol either alone or mixtures thereof.

In yet another embodiment of present invention, said microcapsule release 65-95% water soluble amine based on initial amine content in microcapsules from crushed or ruptured capsules by application of external pressure.

In still another embodiment, the present invention provides a process for the preparation of microcapsule composition comprising the steps of:
i. emulsifying water soluble amine, in paraffin oil containing 0.5 to 10% w/w polymeric surfactant, optionally in presence crosslinker or/and second amine followed by homogenization to obtain a homogenized mixture;
ii. adding 5 to 20% w/w polyisocynate to the homogenized mixture as obtained in step (i) at temperature in the range of 25-60° C. to obtain polyurea microcapsules;
iii. treating the polyurea microcapsules as obtained in step (ii) with fumed silica in the range of 0.2 to 10% w/w based on total weight of microcapsules composition under optimized condition followed by treating with solvent to obtain microcapsules composition.

In yet another embodiment of present invention, the polymeric surfactant is polyester non-ionic surfactant, preferably with hydrophilic lipophilic balance (HLB) between 4 and 13.

In yet another embodiment of present invention, the crosslinker used is in the range of 5-50% w/w and selected from the group consisting of tetraethylene pentamine, triethylenetetramine (TETA), 2,4,4'-triaminodiphenylether, bis (hexamethylene triamine), 1,4,5,8-tetraamino anthraquinone, diethylene triamine (DETA) either alone or mixtures thereof.

In yet another embodiment of present invention, the polyisocynate is aromatic polyisocyanate or aliphatic polyisocyanate, wherein the aromatic polyisocyanate is selected from the group consisting of 2,4- and 2,6-toluene diisocyanate (TDI), naphthalene diisocyanate, diphenyl methane diisocyanate and triphenyl methane-p,p'p"-trityl triisocyanate, polymethylene polyphenylene isocyanate, 2,4,4'-diphenylether triisocyanate, 3,3'-dimethyl-4,4'-diphenyl diisocyanate, 3,3'-dimethoxy-4,4'diphenyl diisocyanate or triphenylmethane 4,4',4" triisocyanate, wherein the aliphatic polyisocyanate is selected from the group consisting of dicyclohexylmethane 4,4'-diisocyanate, hexamethylene 1,6-diisocyanate, isophorone diisocyanate (IPDI), trimethylhexamethylene diisocyanate, trimethylene diisocyanate, propylene-1,2-diisocyanate, butylene 1,2-diisocyanate either alone or mixtures thereof.

In yet another embodiment of present invention, solvent used is selected from pet ether, hexane or mixtures thereof.

In yet another embodiment of present invention, the said composition is useful in pesticides, adhesives, agriculture, asphalt additives, bleach activator, cement, chelating agents, coatings, corrosion inhibitors, detergents/cleaners/fabric softeners, drainage aids, epoxy curing agents, fuel additives, fungicides, gas treating, hydrocarbon purification, ion exchange resins, lube oil additives, metalworking fluids, mineral processing aids, oil well chemicals, paper wet-strength resins, personal care, petroleum chemicals, corrosion inhibitors, demulsifiers, neutralizers, photographic chemicals, plastic lubricant, polyamide resins, printing inks, rubber/rubber processing aids, surfactants, textiles/textile additives, urethane chemicals/foams, wood treating.

DETAILED DESCRIPTION OF THE INVENTION

The present invention provides stable, microcapsule composition comprising at least one reactive agent selected from water soluble amine that acts as both active ingredient as well as microcapsule wall forming agent.

The invention provides stable, encapsulated reactive amine composition, having a particle size about 100 microns or less comprising; a) water soluble amine, b) fumed silica; and c) polyurea as wall material for microcapsule wall, wherein the said composition is useful in pesticides, asphalt additives, chelating agents, corrosion inhibitors, detergents, epoxy curing agents, fungicides, lube oil additives, papers, pharmaceuticals, personal care, photographic chemicals, printing inks, textile and as reagent in various chemical reactions etc. wherein, the reactive amine is released from the encapsulated amine in aqueous and non-aqueous environment.

Reactive amine is the amine which shows response to normal stimulus that is it can react with any other complementary chemical substance at ambient temperature and or reaction conditions forming a new compound/chemical.

The encapsulated reactive agent is water soluble amine also referred as 'first amine' or 'neat amine', wherein the water soluble amine is polyamine or monoamine; wherein the polyamine is selected from the group consisting of polyamine, polyaziridine, such as aziridine PZ-33, aziridine PZ-28, diethylenetriamine (DETA), triethylenetetraamine (TETA), tetraethylene pentamine, 2,4,4'-triaminodiphenylether, bis(hexamethylene) triamine, ethylene diamine (EDA), trimethylenedipiperidine (TMDP), guanidine carbonate (GUCA), phenylene diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene, isophorone diamine, diamino propane, diaminobutane, piperazine (PIP), aminoethylenepiperazine (AEP), tetraethylenepentamine (TEPA), poly (propylene glycol) bis (2-aminopropyl ether) or [Jeffamine D-230], and O,O'-bis (2-aminopropyl) polypropylene glycol-block-polyethylene glycol-block-poly propylene glycol [Jeffamine ED 600] and monoamine is selected from the group consisting of monoethanolamine (MEA), triethanolamine (TEA), triisopropanolamine (TIPA), diisopropylamine (DIPA), N-methylethanolamine (NMEA), N-methyldiethanolamine (MDEA), monoisopropylamine (MIPA), 4-aminopyridine (4-AP), n-propyl amine either alone or mixtures thereof.

Accordingly, the polyaziridine is selected from the group consisting of pentaerythritol tris (3-(1-aziridinyl)) propionate) and trimethylolpropane tris(2-methyl-1-aziridine propionate); such as polyaziridine is aziridine PZ-33 and aziridine PZ-28. The Aziridine PZ-33 is an ethylene imine based tri-functional polyaziridine used in both aqueous and non-aqueous applications such as adhesives and inks. Aziridine PZ-28 is a propylene imine tri-functional polyaziridine used in both aqueous and non-aqueous applications such as adhesives and inks. The water soluble amines preferably have a controlled release profile. Further the instant microcapsule optionally contains second amine along with first amine or in continuous phase such that the second amine acts as microcapsule wall forming agent.

The optionally used second amines are polyamines, may or may not be water soluble and which can be used as microcapsule wall forming material include polyfunctional Aziridine PZ-33, PZ-28 (from poly aziridine L.L.C. NJ, USA), diethylenetriamine (DETA), triethylenetetraamine (TETA), tetraethylene pentamine, 2,4,4'-triaminodiphenylether, bis(hexamethylene) triamine, 1,4,5,8-tetraamino anthraquinone, ethylene diamine (EDA), trimethylenedipiperidine (TMDP), guanidine carbonate (GUCA), phenylene diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophorone diamine, diamino propane, diaminobutane, poly (propylene glycol) bis (2-aminopropyl ether) or [Jeffamine D-230], and O,O'-bis(2-aminopropyl) polypropylene glycol-block-polyethylene glycol-block-poly propylene glycol [Jeffamine ED 600] and mixtures thereof.

In accordance with the embodiment, the instant microcapsules composition is stable and the particle size of the microcapsule is less than 100 microns, preferably 50 microns, and more preferably in the range of 2-35 microns.

In another preferred embodiment, the invention provides a process for preparation of water-soluble amine microcapsules which comprise steps of:

i) emulsifying water soluble amine (first amine), optionally in presence of crosslinker and/or second amine; in paraffin oil containing polymeric surfactant, optionally followed by homogenization;

ii) adding polyisocynate to the mixture of step (i) at suitable temperature followed by treating with fumed silica under optimized condition to obtain polyurea microcapsule containing amine;

iii) isolating the microcapsules containing amine, followed by treating with organic solvent.

In another optional embodiment, the invention provides, process for encapsulation of aqueous solution of water-soluble amine which comprises steps of;

i. emulsifying water soluble amine, in paraffin oil containing 0.5 to 10% w/w polymeric surfactant, optionally in presence crosslinker or/and second amine followed by homogenization to obtain a homogenized mixture;

ii. adding 5 to 20% w/w polyisocynate to the homogenized mixture as obtained in step (i) at temperature in the range of 25-60° C. to obtain polyurea microcapsules;

iii. treating the polyurea microcapsules as obtained in step (ii) with fumed silica in the range of 0.2 to 10% w/w based on total weight of microcapsules composition under optimized condition followed by treating with solvent to obtain microcapsules composition.

The water soluble amine is 'neat amine' encapsulated in the microcapsule, wherein the amine acts as active ingredient (also can be termed as core material or capsule fill or active agent) as well as microcapsule wall forming agent, further the neat amine released is substantially quantitative in terms of amine loaded in microcapsules, when microcapsules are crushed with substantial pressure.

The instant process is an in-situ polymerization in non-aqueous medium. Accordingly the second amine can be applied in continuous phase or with the first amine to form the microcapsules by dispersion or interfacial polymerization reaction respectively. Particularly, when second amine is added along with first amine the reaction goes via interfacial polymerization, whereas when second amine is added in continuous phase it goes via dispersion polymerization.

Further the water-soluble amine encapsulated microcapsule prepared by the instant procedure, exhibit high loading of the water soluble amine i.e. more than 28%.

Particularly, the total water soluble amine content is in the range of 28-90% based on total weight of microcapsule composition.

Further the amount of amine extracted or released from crushed or ruptured capsules is in the range of 74-90% based on initial amine content (loading) in microcapsules.

With regard to the said process, the water soluble amines and optionally used second amine are described herein above. Further the concentration of second amine can be used in the range of 1-20%, preferably 2-10% based on total weight of microcapsule.

Further the microcapsule wall material contains crosslinker in the range of 5-50% w/w, preferably 10-40% w/w based on weight of second amine used.

The aliphatic hydrocarbon used in the instant process is paraffin oil and the stabilizers/surfactant which can be used in the instant invention include non-ionic polymeric surfactants having repeating hydrophilic and hydrophobic units. These surfactants are block or graft copolymers or surfmers which are polymers having functional reactive groups. Particularly, the polymeric surfactant is Polyester non-ionic surfactant (Hypermer A70) available from Uniqema.

EP1434834 describes Hypermer A70 is as the polymeric non-ionic surfactant has Hydrophilic Lipophilic Balance (HLB) of between 4 and 13, preferably between 4 and 8. The polymeric non-ionic surfactant is polyester. Preferably, the hydrophilic units are polyoxyalkylene units, especially polyoxyethylene units; and the hydrophobic units are long chain hydrocarbon residues. Suitable polymeric non-ionic surfactants of this type are available from Uniqema under the trade mark Hypermer (Hypermer is a trade mark owned by the ICI group of companies).

In the instant process, the paraffin oil is used along with suitable polymeric surfactant/stabilizer in the concentration of 0.5 -10% w/w based on total weight of microcapsule forming reactants and polyamine being encapsulated, preferably paraffin oil containing 1-5% w/w of Hypermer A70.

Additionally, 'catalyst' may comprise amino or organometallic compounds such as N,N'-dimethylaminoethanol, N,N'-dimethylcyclohexylamine, bis[2-(N,N' dimethyl amino) ethyl] ether, N,N'-dimethylacetylamine, diaminobicyclooctane, stannous octoate and dibutyltindilaurate, and mixtures thereof.

Further the 'polyisocyanate' which can be used as microcapsule wall forming material include aromatic polyisocyanates, aliphatic polyisocyanates, and mixtures thereof, wherein aromatic polyisocyanate is selected from the group consisting of, 2,4-and 2,6-toluene diisocyanate (TDI), naphthalene diisocyanate, diphenyl methane diisocyanate and triphenyl methane-p,p'p"-trityl triisocyanate, polymethylene polyphenylene isocyanate, 2,4,4'-diphenylether triisocyanate, 3,3'-dimethyl-4,4'-diphenyl diisocyanate, 3,3'-dimethoxy-4,4'diphenyl diisocyanate, and triphenyl-methane 4,4', 4" triisocyanate; and the aliphatic polyisocyanate is selected from the group consisting of, Dicyclohexylmethane 4,4'-diisocyanate, hexamethylene 1,6-diisocyanate, isophorone diisocyanate (IPDI), trimethyl-hexamethylene diisocyanate, trimethylene diisocyanate, propylene-1,2-diisocyanate and butylene1,2-diisocyanate and mixtures thereof.

Further the concentration of polyisocyanate used in the composition is in the range of 5-20%, based on total weight of microcapsule.

In another embodiment of the process, the said crosslinker contains more than two amine functionalities such as tetraethylene pentamine, Triethylenetetramine (TETA), 2,4,4'-triaminodiphenylether, bis(hexamethylene triamine), 1,4,5,8-tetraamino anthraquinone and diethylene triamine (DETA), and mixtures thereof.

The addition of polyisocyanate is carried out drop-wise at the rate of 0.2-2.5 g of polyisocyanate solution in paraffin oil per minute at temperature range 25-40° C., after addition of polyisocyanate the temperature of reaction mixture is maintained at 25°-60° C. for 1 to 5 hours.

According to the process, the fumed silica is added in the range of 0.2 to 1.5 g, in 2-4 lots at different stages during the microencapsulation process. Subsequently the reaction mixture is agitated for 2-18 hours by lowering the temperature to ambient, preferably 25-30° C. and at a stirring speed to 500-800 rpm followed by adding another solvent like pet ether, hexane and like thereof. Further the fumed silica employed in the instant composition with the concentration is in the range of 0.2-10.0%, based on total weight of microcapsule during process of microencapsulation.

The isolation of the microcapsules is carried out by the known process such as filtration and centrifugation. Further washing the amine encapsulated microcapsules with non-aqueous organic solvent such as pet ether, hexane and mixtures thereof, optionally drying amine encapsulated microcapsules under vacuum at 40-45° C., subsequently the amine microcapsules are stored either as dry powder or as dispersion in non-polar organic solvent such as hexane, pet ether, or mixtures thereof.

The instant process to prepare the amine encapsulated microcapsule composition is cost effective and robust will yield more than 91% of microcapsules, preferably 91%-100%.

In another embodiment, the amine microcapsules optionally comprise an agent to prevent agglomeration of the microcapsules is selected from fumed silica, talc, alumina and mixtures thereof; preferably fumed silica.

In yet another embodiment, the microcapsules comprise fumed silica in the range of 1 to 10% during microencapsulation process and 1 to 40% while isolating microcapsules as dry powder based on total weight of microcapsule forming ingredients namely amine and wall forming monomers. The concentration of fumed silica is in the range of 5-25% w/w based on total weight of microcapsule composition.

In another embodiment, the stable, encapsulated reactive amine composition, having a particle size about 100 microns or less comprising; a) polyaziridine; b) Polyurea as wall material for microcapsule wall and c) fumed silica, wherein the polyaziridine is released from the said composition in aqueous and non-aqueous environment.

In another embodiment, the instant microcapsule composition containing amine is useful in industries viz. painting, cosmetics, paper, lubricants, printing, plastics, petrochemicals, agriculture, coating etc.

The said microcapsule composition containing amine is useful in different applications and not limited to adhesives, agriculture, Asphalt additives, bleach activator, cements, chelating agents, coatings, corrosion inhibitors, detergents/cleaners/fabric softeners, drainage aids, epoxy curing agents, fuel additives, fungicides, gas treating, hydrocarbon purification, ion exchange resins, Lube oil additives, metalworking fluids, mineral processing aids, oil well chemicals, paper wet-strength resins, personal care, petroleum chemicals such as corrosion inhibitors, demulsifiers, neutralizers, photographic chemicals, plastic lubricant, polyamide resins, printing inks, rubber/rubber processing aids, surfactants, textiles/textile additives, urethane chemicals/foams, wood treating and like thereof.

EXAMPLES

Following examples are given by way of illustration therefore should not be construed to limit the scope of the invention.

The expression "pet ether" as used herein means petroleum ether.

Example 1

Preparation of Microcapsules Containing Aziridine PZ33 with 80% Loading without Using Second Amine 1.04 g of surfactant Hypermer A70 was dissolved in 120 g of paraffin oil. To this solution 18.75 g of polyfunctional amine namely Aziridine PZ-33 was added while stirring this mixture at 1000 rotation per minute (rpm) using turbine type stirrer at 35° C. To this mixture 2.0 g of IPDI (isophorone diisocyanate) in 5 g of paraffin oil was added drop-wise at the rate of 2.0 g per minute of IPDI solution per minute. After 10 minutes the reaction temperature was raised to 50° C. After stirring the reaction mixture for 1 hour the temperature was raised to 60° C. followed by addition of 30 g of paraffin oil containing 0.25 g of Hypermer A70. After one hour 0.3 g fumed silica was added. Further at one and half hour interval each time 0.3 g of fumed silica was added. After stirring the reaction mixture for total 4 hours at 60° C., temperature and stirring speed was reduced to 35 C and 500 rpm respectively. Thereafter by stirring the mixture for further 15 hours at 35 C, 0.3 g of fumed silica was added. Thereafter 150 ml of pet-ether was added and stirred further for 1 hour. The amine microcapsules thus formed were isolated by filtration and were stored as dispersion in pet ether. Microcapsules have size range of 2-75 microns, of which majority of capsules were 10-25 microns. Weighed amount of microcapsule-pet ether dispersion (5 g) was taken in petri dish. Pet ether was evaporated at 25° C. followed by drying in vacuum oven at 40° C. for 3 hours. Thus solid content in the amine microcapsules-pet ether dispersion was determined and yield of the microcapsules was calculated. The Yield of amine microcapsules obtained was 100%.

Example 2

Preparation of Microcapsules Containing Aziridine PZ33 with 80% Loading, Using Second Amine 0.24 g of surfactant Hypermer A70 was dissolved in 120 g of paraffin oil. To this solution 19.6 g of polyfunctional amine namely Aziridine PZ-33—followed by—1 g of DETA was added while stirring this mixture at 1000 rotation per minute (rpm) using turbine type stirrer at 25° C. To this mixture 3.9 g of IPDI in 5 g of paraffin oil was added drop-wise at the rate of 0.9 g of IPDI solution per minute. Reaction mixture was then stirred for 2 hours at 40 C and 1 hour at 50° C. Thereafter 0.2 g of fumed silica was added and temperature was raised to 60° C. and stirred for further 2 hours. Then the reaction temperature was brought to 26° C. and stirring speed was reduced to 500 rpm. Thereafter by stirring the mixture for further 17 hours 0.1 g of fumed silica and 140 ml of pet-ether were added and stirred further for 1 hour. The amine microcapsules thus formed were isolated by centrifugation, washed with pet ether three times and stored as dispersion in pet ether. The amine microcapsules have size range of 2-50 microns, of which majority of capsules were 15-25 microns. Weighed amount of microcapsule-pet ether dispersion (7 g) was taken in petri dish. Pet ether was evaporated at 26° C. followed by drying in vacuum oven at 45° C. for 3 hours. Thus solid content in amine microcapsules-pet ether dispersion was determined and yield of the microcapsules was calculated. The yield of the amine microcapsules obtained is 95%.

Example 3

Preparation of Microcapsules Containing Aziridine PZ33 with 80% Loading, Using Second Amine 0.24 g of surfactant Hypermer A70 was dissolved in 120 g of paraffin oil. To this solution 19.6 g of polyfunctional amine namely Aziridine PZ-33 containing 1 g of DETA was added while stirring this mixture at 1000 rotation per minute (rpm) using turbine type stirrer at 27° C. To this mixture 3.9 g of IPDI in 5 g of paraffin oil was added drop-wise at the rate of 0.8 g of IPDI solution per minute. Reaction mixture was then stirred for 2 hours at 40° C. and 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm. Thereafter by stirring the mixture for further 17 hours 0.3 g of fumed silica was added followed by 130 ml of pet-ether and stirred further for 1 hour. The amine microcapsules thus formed were isolated by filtration and washed with pet ether and stored as dispersion in pet ether. The amine microcapsules have size range of 2-60 microns, of which majority of capsules were 10-30 microns. Weighed amount of microcapsules-pet ether dispersion (6 g) was taken in petri dish. Pet ether was evaporated at 25° C. followed by drying in vacuum oven at 45° C. for 4 hours. Thus solid content in amine containing microcapsules-pet ether dispersion was determined and yield of the microcapsules was calculated. The Yield of the amine microcapsules obtained is 100%.

Example 4

Preparation of Microcapsules Containing Aziridine PZ33 with 80% Loading, Using Second Amine and 30% TETA as a Crosslinker 0.34 g of surfactant Hypermer A70 was dissolved in 120 g of paraffin oil. To this solution 27.2 g of polyfunctional amine namely Aziridine PZ-33 containing 1 g of EDA and 0.3g TETA was added while stirring this mixture at 1000 rotation per minute (rpm) using turbine type stirrer at 30° C. To this mixture 5.5 g of IPDI in 5 g of paraffin oil was added drop-wise at the rate of 1.2 g of IPDI solution per minute. The reaction mixture was then stirred for 2 hours at 40° C. followed by addition of 0.3 g fumed silica. The reaction mixture was further stirred for 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm followed by addition of 0.3 g fumed silica. Thereafter by stirring the mixture for further 17 hours, 0.3 g of fumed silica was added followed by 150 ml pet-ether and stirred further for 1 hour. The amine microcapsules thus formed were isolated by filtration and washed with pet-ether and stored as dispersion in pet-ether. The amine microcapsules have size range of 5-50 microns, of which majority of capsules were 15-35 microns. Weighed amount of microcapsules-pet ether dispersion (5g) was taken in petri dish. Pet ether was evaporated at 27° C. followed by drying in vacuum oven at 45° C. for 3.5 hours. Thus, solid content in amine containing microcapsules-pet ether dispersion was determined and yield of microcapsules was calculated. The yield of the amine microcapsules obtained was 99.3%.

To this microcapsules-pet ether dispersion 15% fumed silica (w/w) with respect to total amount of monomers and PZ33 was added. The mixture was gently shaken for 2 minutes and the dispersion was then poured into the weighed petri dish. The pet ether was evaporated at RT followed by drying under vacuum at 45° C. for 4 hrs. Then, the weight of dried microcapsules was calculated by subtracting the weight of the petri dish. Dried microcapsules were then sieved through the 90 micron mesh size (ASTM. No. 170). The sieved part was taken as final product of the microencapsulation process.

Example 5

Preparation of Microcapsules Containing Aziridine PZ33 with 80% Loading Using Second Amine 0.272 g of surfactant Hypermer A70 was dissolved in 120 g of paraffin oil. To this solution 21.76 g of polyfunctional amine namely Aziridine PZ-33 containing 1 g of EDA was added while stirring this mixture at 1000 rotation per minute (rpm) using turbine type stirrer at 30° C. To this mixture 4.44 g of IPDI in 5 g of paraffin oil was added drop-wise at the rate of 1.0 g of IPDI solution per minute. The reaction mixture was then stirred for 2 hours at 40° C. followed by addition of 0.3 g fumed silica. The reaction mixture was further stirred for 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm followed by addition of 0.3 g fumed silica. Thereafter by stirring the mixture for further 17 hours, 0.3 g of fumed silica was added followed by 135 ml pet-ether and stirred further for 1 hour. The amine microcapsules thus formed were isolated by filtration and washed with pet-ether and stored as dispersion in pet-ether. The amine microcapsules have size range of 2-50 microns, of which majority of capsules were 10-35 microns. Weighed amount of microcapsulse-pet ether dispersion (7 g) was taken in petri dish. Pet ether was evaporated at 25° C. followed by drying in vacuum oven at 45 C for 4 hours. Thus, solid content in amine containing microcapsules-pet ether dispersion was determined and yield of microcapsules was calculated. The yield of the amine microcapsules obtained was 99%.

Example 6

Preparation of Microcapsules Containing Aziridine PZ33 with 80% Loading Using Second Amine and 40% TETA as a Crosslinker 0.365 g of surfactant Hypermer A70 was dissolved in 120 g of paraffin oil. To this solution 29.2 g of polyfunctional amine namely Aziridine PZ-33 containing 1 g of EDA and 0.4 g TETA was added while stirring this mixture at 1000 rotation per minute (rpm) using turbine type stirrer at 30° C. To this mixture 5.9 g of IPDI in 5 g of paraffin oil was added drop-wise at the rate of 0.5 g of IPDI solution per minute. The reaction mixture was then stirred for 2 hours at 40° C. and 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm. Thereafter by stirring the mixture for further 17 hours 0.3 g of fumed silica was added followed by 130 ml pet-ether and stirred further for 1 hour. The amine microcapsules thus formed were isolated by filtration and washed with pet-ether and stored as dispersion in pet-ether. The amine microcapsules have size range of 5-60 microns, of which majority of capsules were 10-50 microns. Weighed amount of microcapsules-pet ether dispersion (5 g) was taken in petri dish. Pet ether was evaporated at 26° C. followed by drying in vacuum oven at 45° C. for 4 hours. Thus, solid content in amine containing microcapsules-pet ether dispersion was determined and yield of microcapsules was calculated. The yield of the amine microcapsules obtained was 100%.

To this microcapsules-pet ether dispersion 15% fumed silica (w/w) with respect to total amount of monomers and PZ33 was added. The mixture was gently shaken for 1 minutes and the dispersion was then poured into the weighed petri dish. The pet ether was evaporated at RT followed by drying under vacuum at 45° C. for 3 hrs. Then, the weight of dried microcapsules was calculated by subtracting the weight of the petri dish. Dried microcapsules were then sieved through the 90 micron mesh size (ASTM. No. 170). The sieved part was taken as final product of the microencapsulation process.

Example 7

Preparation of Microcapsules Containing Aziridine PZ33 with 80% Loading Using Second Amine 1.16 g of surfactant Hypermer A70 was dissolved in 120 g of paraffin oil. To this solution 18.6 g of polyfunctional amine namely Aziridine PZ-33 containing 1 g of TETA was added while stirring this mixture at 1000 rotation per minute (rpm) using turbine type stirrer at 27 C. To this mixture 3.65 g of IPDI in 5 g of paraffin oil was added drop-wise at the rate of 0.7 g of IPDI solution per minute. The reaction mixture was then stirred for 2 hours at 40° C. and 1 hour at 50° C. Thereafter, 0.2 g of fumed silica was added and temperature was raised to 60° C. and stirred for further 2 hours. Then the reaction temperature was brought to 35° C. and stirring speed was reduced to 500 rpm. Thereafter by stirring the mixture for further 17 hours 0.2 g of fumed silica was added followed by 150 mL pet-ether and stirred further for 1 hour. The amine microcapsules thus formed were isolated by filtration and washed with pet-ether and stored as dispersion in pet-ether. The amine microcapsules have size range of 2-65 microns, of which majority of capsules were 15-35 microns. Weighed amount of microcapsules-pet ether dispersion (6 g) was taken in petri dish. Pet ether was evaporated at 25° C. followed by drying in vacuum oven at 45° C. for 3.5 hours. Thus, solid content in amine containing microcapsules-pet ether dispersion was determined and yield of microcapsules was calculated. The yield of the amine microcapsules obtained was 97%.

Example 8

Preparation of Microcapsules Containing TETA with 40% Loading, Using Second Amine 0.375 g of surfactant Hypermer A70 was dissolved in 120 g of paraffin oil. To this solution 3 g TETA was added followed by 1 g of EDA while stirring this mixture at 1000 rotation per minute (rpm) using turbine type stirrer at 35° C. To this mixture TDI solution (3.5 g of TDI in 5 g of paraffin oil) was added drop-wise at the rate of 1 g of TDI solution per minute. After 4 hours 0.2 g fumed silica was added and after 2 hours the stirring speed was reduced to 500 rpm and reaction mixture was then further stirred for 15 hours. After 15 hours 0.2 g fumed silica was added and then the reaction mixture was stirred at 60 C for 1 hour. Then the reaction mixture was brought to 26° C. To this mixture 150 ml of pet ether was added and stirred further for 1 hr.

Microcapsules thus formed were isolated by filtration, washed 2 times with total volume of 300 ml of pet ether and stored as dispersion in pet ether. Then weighed amount of pet ether-microcapsule dispersion (5 g) was taken in the petri dish and the pet ether was evaporated at 26° C. followed by drying under vacuum at 45° C. for 4 hrs. Thus solid content in the microcapsule-pet ether dispersion was determined and yield was calculated. Microcapsules were spherical shape particles and have size range of 2-25 microns and majority of which were 5-15 microns. Yield of microcapsules obtained was 99%.

Example 9

Preparation of Blank Polymer Microspheres (without Amine as Core Material)

0.05 g of surfactant Hypermer A70 was dissolved in 120 g of paraffin oil. To this solution, 1 g of TETA was added while stirring this mixture at 1000 rotation per minute (rpm) using turbine type stirrer at 30° C. To this mixture 3.7 g of IPDI in 5 g of paraffin oil was added drop-wise at the rate of 0.3 g of IPDI solution per minute. To this reaction mixture each time 0.3 g of fumed silica was added after 3 hours and 4 hours. Then after 6 hours the stirring speed was reduced to 500 rpm and stirring of the mixture continued for further 17 hours. Then, 0.3 g of fumed silica was added followed by 130 mL pet-ether and stirred further for 1 hour. The blank microspheres thus formed were isolated by filtration and washed with pet-ether and stored as a powder. The blank microspheres have size range of 2-10 microns. The yield of the blank microspheres obtained was 100%.

Example 10

Preparation of Microcapsules Containing Aziridine PZ33 with 80% Loading, Using Second Amine 1.23 g of surfactant Hypermer A70 was dissolved in 120 g of paraffin oil. To this solution 19.6 g of polyfunctional amine namely Aziridine PZ-33 was added and homogenized for 4 minutes. The emulsion was then transferred to reaction kettle assembled with over-head stirrer. 1 g of DETA was then added while stirring this mixture at 1000 rotation per minute (rpm) using turbine type stirrer at 25° C. To this mixture 3.9 g of IPDI in 5 g of paraffin oil was added drop-wise at the rate of 0.8-2.0 g of IPDI solution per minute. Reaction mixture was then stirred for 2 hours at 40° C. and 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm. Thereafter by stirring the mixture for further 17 hours, 0.3 g of fumed silica was added followed by 120 ml of pet-ether and stirred further for 1 hour. The amine microcapsules thus formed were isolated by filtration and washed with pet-ether and stored as dispersion in pet ether. The amine microcapsules have size range of 2-20 microns, of which majority of capsules were 15-20 microns. Weighed amount of microcapsules-pet ether dispersion (6 g) was taken in petri dish. Pet ether was evaporated at 26° C. followed by drying in vacuum oven at 45° C. for 3 hours. Thus solid content in amine containing microcapsules-pet ether dispersion was determined and yield of the microcapsules was calculated. The Yield of the amine microcapsules obtained was 99%.

Example 11

Preparation of Microcapsules Containing 4-aminopyridine (4AP) with 40% Loading, Using Second Amine 0.41 g of surfactant Hypermer A70 was dissolved in 120 g of paraffin oil. To this solution 3.27 g of 4-aminopyridine was added and homogenized for 9 minutes followed by addition of 1 g of DETA and further homogenized for 1 minute. The emulsion was then transferred to reaction kettle assembled with over-head stirrer. This mixture was then stirred at 1000 rotation per minute (rpm) using turbine type stirrer at 30° C. To this mixture 3.9 g of IPDI in 5 g of paraffin oil was added drop-wise at the rate of 1.5 g of IPDI solution per minute. Reaction mixture was then stirred for 2 hours at 40° C. and 1 hour at 50° C. followed by addition of 0.3 g of fumed silica. Thereafter temperature was raised to 60° C. and stirred for further 2 hours and 0.3 g of fumed silica was added. Then the reaction temperature was brought to 35° C. and stirring speed was reduced to 500 rpm followed by addition of 0.3 g fumed silica. Thereafter by stirring the mixture for further 17 hours, 0.3 g of fumed silica was added followed by 200 ml of pet-ether and stirred further for 1 hour. The amine microcapsules thus formed were isolated by filtration and washed with pet-ether and stored as dispersion in pet ether. The amine microcapsules have size range of 2-20 microns, of which majority of capsules were 5-15 microns. Weighed amount of microcapsules-pet ether dispersion (7 g) was taken in petri dish. Pet ether was evaporated at 25° C. followed by drying in vacuum oven at 45° C. for 4 hours. Thus solid content in amine containing microcapsules-pet ether dispersion was determined and yield of the microcapsules was calculated. The Yield of the amine microcapsules obtained was 98%.

To this microcapsules-pet ether dispersion 15% fumed silica (w/w) with respect to total amount of monomers and 4AP was added. The mixture was gently shaken for 2 minutes and the dispersion was then poured into the weighed petri dish. The pet ether was evaporated at 25° C. followed by drying under vacuum at 45° C. for 3 hrs. Then, the weight of dried microcapsules was calculated by subtracting the weight of the petri dish.

Example 12

Preparation of Microcapsules Containing poly (propylene glycol) bis (2-aminopropyl ether) (Jeffamine Mol. Wt. 230) with 50% Loading, Using Second Amine 0.1 g of surfactant Hypermer A70 was dissolved in 120 g of paraffin oil. To this solution 4.9 g of Jeffamine containing 1 g of DETA was added while stirring this mixture at 1000 rotation per minute (rpm) using turbine type stirrer at 27° C. To this mixture 3.9 g of IPDI in 5 g of paraffin oil was added drop-wise at the rate of 0.6 g of IPDI solution per minute. Then, 0.5 g of Hypermer A70 in 10 g of paraffin oil was added. After, 3 hours and 4 hours, 0.3 g fumed silica was added at each time. Then at 6 hours the stirring speed was reduced to 500 rpm followed by addition of 0.3 g fumed silica. Thereafter by stirring the mixture for further 17 hours, 0.3 g of fumed silica was added followed by 150 ml pet-ether and stirred further for 1 hour. The amine microcapsules thus formed were isolated by filtration and washed with pet-ether and stored as dispersion in pet-ether. The amine microcapsules have size ranges of 5-40 microns of which majority of capsules were 10-25 microns. Weighed amount of microcapsulse-pet ether dispersion (5 g) was taken in petri dish. Pet ether was evaporated at 25° C. followed by drying in vacuum oven at 45 C for 3 hours. Thus, solid content in amine containing microcapsules-pet ether dispersion was determined and yield of microcapsules was calculated. The yield of the amine microcapsules obtained was 93%.

Example 13

Preparation of Microcapsules Containing O,O'-Bis(2-aminopropyl) polypropylene glycol-block-polyethylene glycol-block-polypropylene glycol 500 (Jeffamine ED 600, Mol. Wt. 600) with 50% Loading, Using Second Amine 0.1 g of surfactant Hypermer A70 was dissolved in 120 g of paraffin oil. To this solution 4.9 g of Jeffamine containing 1 g of DETA was added while stirring this mixture at 1000 rotation per minute (rpm) using turbine type stirrer at 30° C. To this mixture 3.9 g of IPDI in 5 g of paraffin oil was added drop-wise at the rate of 0.7 g of IPDI solution per minute. Then, 0.5 g of Hypermer A70 in 10 g of paraffin oil was added. After, 3 hours and 4 hours 0.3 g fumed silica was added at each time. Then at 6 hours the stirring speed was reduced to 500 rpm followed by addition of 0.3 g fumed silica. Thereafter by stirring the mixture for further 17 hours, 0.3 g of fumed silica was added followed by 160 ml pet-ether and stirred further for 1 hour. The amine microcapsules thus formed were isolated by filtration and washed with pet-ether and stored as dispersion in pet-ether. The amine microcapsules have size ranges of 5-60 microns of which majority of capsules were 15-35 microns. Weighed amount of microcapsulse-pet ether dispersion (5 g) was taken in petri dish. Pet ether was evaporated at 26° C. followed by drying in vacuum oven at 45° C. for 4 hours. Thus, solid content in amine containing microcapsules-pet ether dispersion was determined and yield of microcapsules was calculated. The yield of the amine microcapsules obtained was 94%.

To this microcapsules-pet ether dispersion 15% fumed silica (w/w) with respect to total amount of monomers and Jeffamine ED600 was added. The mixture was gently shaken for 1-2 minutes and the dispersion was then poured into the weighed petri dish. The pet ether was evaporated at RT followed by drying under vacuum at 45° C. for 3 hrs. Then the weight of dried microcapsules was calculated by subtracting the weight of the petri dish.

Example 14

Preparation of Microcapsules Containing Hexamethylene Diamine (HMDA) with 40% Loading, Using Second Amine 0.09 g of surfactant Hypermer A70 was dissolved in 120 g of paraffin oil. To this solution 3.63 g of 70% hexamethylene diamine solution in water containing 1 g of EDA was added while stirring this mixture at 1000 rotation per minute (rpm) using turbine type stirrer at 30° C. To this mixture 4.44 g of IPDI in 5 g of paraffin oil was added drop-wise at the rate of 0.8 g of IPDI solution per minute. After addition of IPDI, solution of 0.45 g surfactant Hypermer A70 in 10 g of paraffin oil was added. The reaction mixture was then stirred for 2 hours at 40° C. and 1 hour at 50° C. followed by addition of 0.3 g fumed silica. Thereafter temperature was raised to 60° C. and stirred for further 2 hours and 0.3 g of fumed silica was added. Then the reaction temperature was brought to 35° C. and stirring speed was reduced to 500 rpm followed by addition of 0.3 g fumed silica. Thereafter by stirring the mixture for further 17 hours, 0.3 g of fumed silica was added followed by 150 ml pet-ether and stirred further for 1 hour. The amine microcapsules thus formed were isolated by filtration and washed with pet-ether and stored as dispersion in pet-ether. The amine microcapsules have size range of 2-30 microns, of which majority of capsules were 10-20 microns. Weighed amount of microcapsulse-pet ether dispersion (7 g) was taken in petri dish. Pet ether was evaporated at 26° C. followed by drying in vacuum oven at 45° C. for 4 hours. Thus, solid content in amine containing microcapsules-pet ether dispersion was determined and yield of microcapsules was calculated. The yield of the amine microcapsules obtained was 91%. The loading (amine+water) in microcapsules was 40% and neat amine content in microcapsule was 28%.

Example 15

Preparation of Microcapsules Containing n-propyl amine (nPA) with 50% Loading, Using Second Amine 0.1 g of surfactant Hypermer A70 was dissolved in 120 g of paraffin oil. To this solution 4.9 g of 70% n-propyl amine solution in water containing 1 g of DETA was added while stirring this mixture at 1000 rotation per minute (rpm) using turbine type stirrer at 30° C. To this mixture 3.9 g of IPDI in 5 g of paraffin oil was added drop-wise at the rate of 0.9 g of IPDI solution per minute. Then, the reaction mixture was stirred for 2 hours at 40° C. and 1 hour at 50° C. followed by addition of 0.3 g fumed silica. Thereafter temperature was raised to 60° C. and stirred for further 2 hours and 0.3 g of fumed silica was added. Then the reaction temperature was brought to 35° C. and stirring speed was reduced to 500 rpm followed by addition of 0.3 g fumed silica. Thereafter by stirring the mixture for further 17 hours, 0.3 g of fumed silica was added followed by 170 ml pet-ether and stirred further for 1 hour. The amine microcapsules thus formed were isolated by filtration and washed with pet-ether and stored as dispersion in pet-ether. The amine microcapsules have size range of 5-40 microns, of which majority of capsules were 15-35 microns. Weighed amount of microcapsulse-pet ether dispersion (5 g) was taken in petri dish. Pet ether was evaporated at 26° C. followed by drying in vacuum oven at 45° C. for 3 hours. Thus, solid content in amine containing microcapsules-pet ether dispersion was determined and yield of microcapsules was calculated. The yield of the amine microcapsules obtained was 93%. The microcapsule loading (amine+water) was 50% and neat amine content in microcapsules was 35%.

To this microcapsules-pet ether dispersion 15% fumed silica (w/w) with respect to total amount of monomers and nPA was added. The mixture was gently shaken for 1 minutes and the dispersion was then poured into the weighed petri dish. The pet ether was evaporated at RT followed by drying under vacuum at 45° C. for 3 hrs. Then, the weight of dried microcapsules was calculated by subtracting the weight of the petri dish.

Example 16

Preparation of microcapsules containing Aziridine PZ33 with 80% loading, using second amine 0.436 g of surfactant Hypermer A70 was dissolved in 120 g of paraffin oil. To this solution 17.44 g of polyfunctional amine namely Aziridine PZ-33 containing 1 g of EDA was added while stirring this mixture at 1000 rotation per minute (rpm) using turbine type stirrer at 25-27° C. To this mixture 3.36 g of HMDI in 7 g of paraffin oil was added drop-wise at the rate of 0.6 g of HMDI solution per minute. Reaction mixture was then stirred for 2 hours at 40° C. and 1 hour at 50° C. Thereafter 0.3 g of fumed silica was added and temperature was raised to 60° C. and stirred for further 2 hours. Then the reaction temperature was brought to 35° C. and stirring speed was reduced to 500 rpm followed by addition of 0.3 g fumed silica. Thereafter by stirring the mixture for further 17 hours 0.3 g of fumed silica was added followed by 130 mL of pet-ether and stirred further for 1 hour. The amine microcapsules thus formed were isolated by filtration and washed with pet ether and stored as dispersion in pet ether. The amine microcapsules have size range of 5-50 microns, of which majority of capsules were 20-35 microns. Weighed amount of microcapsules-pet ether dispersion (5 g) was taken in petri dish. Pet ether was evaporated at 26° C. followed by drying in vacuum oven at 45° C. for 3 hours. Thus solid content in amine containing microcapsules-pet ether dispersion was determined and yield of the microcapsules was calculated. The Yield of the amine microcapsules obtained was 99%.

Characterization of Microcapsules Containing Aziridine PZ33

Amine Content in Microcapsules (Titration Method): The titration was carried out using standardized 0.05 N HCl and indicator namely methyl red (MR).

Calibration: The Calibration was done as follows. Stock solution of 10,000 ppm of Aziridine PZ33 was prepared by dissolving 1.0 g of Aziridine PZ33 in 100 mL of distilled water. From this stock solution, solutions of different concentrations (from 600 to 10,000 ppm) are prepared. These solutions were titrated against 0.05 N HCl having end point from yellow to pink. Calibration curve of HCl in mg vs amine in mg was obtained.

Estimation of Amine Content in Microcapsules:

0.2 g of microcapsules were taken in mortar and crushed for 3 minutes with pestle (60 rounds 3 times), these crushed microcapsules were transferred by washing with water in a 250 mL conical flask. This wash was titrated with standardized HCl and the end point of the titration was noted. Then converted mL of HCl into mg of HCl. From the calibration curve mg of amine present in 0.2 g of microcapsules was calculated and finally the % loading of amine in microcapsules was determined.

Amines loading in microcapsules of different microcapsule samples (with theoretical 80% loading) are given in Table 1.

TABLE 1

| Example | % amine obtained from crushed microcapsules | % of amine extracted out from crushed microcapsules based on theoretical loading (80%) |
|---|---|---|
| 1 | 53 | 66 |
| 2 | 62 | 78 |
| 3 | 66 | 83 |
| 4 | 76 | 95 |
| 5 | 72 | 90 |
| 6 | 59 | 74 |
| 7 | 69 | 86 |
| 10 | 52 | 65 |

Amount of amine obtained from crushed microcapsules as estimated by titration method was less than expected (80%). The similar observation has been made by David et. al. (Macromolecules, 2010, 43, p 1855-1859) when they encapsulated DEH-52 (Amine adduct) curing agent and estimated amount of amine in microcapsules by titration method. They could get only 35% amine loading against 55% theoretical loading and loading obtained by thermogravimetric analysis (TGA). David et al. suggested that lower loading obtained by titration as compared to that obtained by TGA may be due the facts that either residual DEH-52 may have remained in the capsules or protonated during the digestion. David et al. could estimate only 64% amine [(35×100)/55] from microcapsules, whereas the present inventors obtained 65-95% amine from instant microcapsule composition.

The estimation carried out by the inventors (though show less amine due to above said reason) indicates that, maximum amount of amine is released when capsules are crushed.

Also as yield of microcapsules obtained was more than 91%, amount of amine loading in microcapsules can be taken as theoretical value (for example—80% amine loading for samples shown in Table 1).

Figure 1:
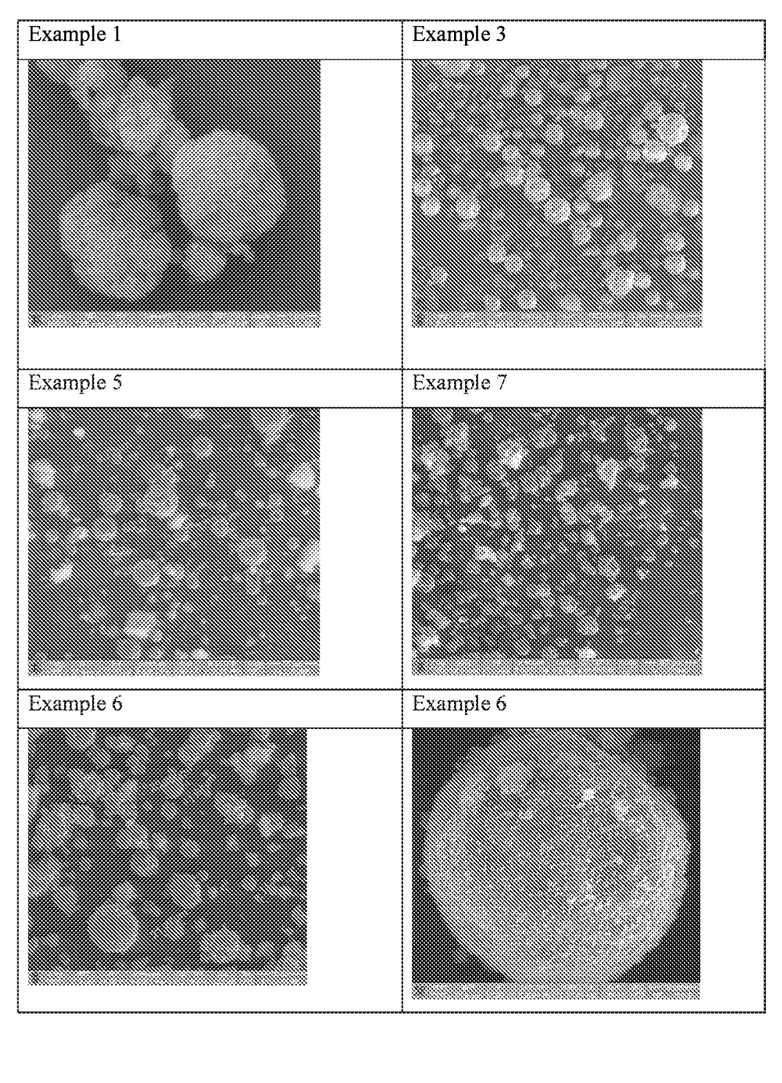
FIG. 1 depicts scanning electron microscope (SEM) of microcapsules containing amine (PZ 33)

SEM of microcapsules prepared as per this invention are shown in FIG. 1. FT-IR analysis of neat Aziridine PZ33 and Aziridine PZ33 extracted in chloroform from microcapsules was carried out. Peak assignments for neat Aziridine PZ33 are as follows:

Peaks at 2843 $cm^{-1}$ to 2962 $cm^{-1}$ for asymmetric and symmetric stretching of Aziridine ring $CH_2$. Peak at 1730 $cm^{-1}$ for ester and peak at 1258 $cm^{-1}$ symmetrical ring breathing. Peaks at 1139-1183 $cm^{-1}$ for $CH_2$ wagging.

Aziridine extracted from microcapsules also show the same peaks as those in neat Aziridine indicating that Aziridine does not undergo any chemical reaction during microencapsulation.

ADVANTAGES OF THE INVENTION

The present invention use water soluble amine which is acted as active ingredient as well as microcapsule wall forming agent, and thus obviates the formation of amine salts and adduct for release of neat amine, also the micron size of microcapsules is less than 100 microns. The content of amine encapsulated is more than 28% w/w. The microcapsule composition containing amine is useful in industries viz. painting, cosmetics, paper, lubricants, printing, plastics, petrochemicals, agriculture, coating etc. Further the process for the preparation of same is cost effective, industrially viable.

We claim:

1. A microcapsule composition having a particle size in the range of 2-100 microns wherein the said composition comprising 28-90% w/w water soluble amine, 5-75% w/w polyurea and 5-25% w/w fumed silica, optionally comprising 5-50% w/w cross linker and/or 2-20% w/w second amine.

2. The microcapsule composition as claimed in claim 1, wherein the water soluble amine is monoamine or polyamine, wherein the monoamine is selected from the group consisting of monoethanolamine (MEA), triethanolamine (TEA), triisopropanolamine (TIPA), diisopropylamine (DIPA), N-methylethanolamine (NMEA), N-methyl diethanolamine (MDEA), monoisopropylamine (MIPA), 4-aminopyridine (4-AP), n-propyl amine, either alone or mixtures thereof, wherein the polyamine is selected from the group consisting of ethylene imine based tri-functional polyaziridine, propylene imine based tri-functional polyaziridine, diethylenetriamine (DETA), triethylenetetraamine (TETA), tetraethylene pentamine, 2,4,4'-triaminodiphenylether, bis(hexamethylene) triamine, ethylene diamine (EDA), trimethylenedipiperidine (TMDP), guanidine carbonate (GUCA), phenylene diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene-isophorone diamine, diamino propane, diaminobutane, piperazine (PIP), aminoethylenepiperazine (AEP), poly (propylene glycol) bis (2-aminopropyl ether) and o,o'-bis(2-aminopropyl) polypropylene glycol-block-polyethylene glycol-block-poly propylene glycol.

3. The microcapsule composition as claimed in claim 1, wherein the second amine is selected from the group consisting of ethylene imine based tri-functional polyaziridine, propylene imine based tri-functional polyaziridine, diethylenetriamine (DETA), triethylenetetraamine (TETA), tetraethylene pentamine, 2,4,4'-triaminodiphenylether, bis(hexamethylene) ethylene diamine (EDA), trimethylenedipiperidine (TMDP), tetraamino anthraquinone, guanidine carbonate (GUCA), diamine, toluene diamine, pentamethylene hexamine, 1,6-hexamethylene diamine, 2,4-diamino-6-methyl-1,3,5 triazine 1,2-diaminocyclohexane, 4,4'-diaminodiphenylmethane, 1,5-diaminonaphthalene- isciphorone diamine, diamino propane, diaminobutane, Poly (propylene glycol) bis (2-aminopropyl ether), O,O'-bis(2-aminopropyl) polypropylene glycol-block-polyethylene glycol-block-poly propylene glycol, either alone or mixtures thereof.

4. A process for the preparation of microcapsule composition as claimed in claim 1, said process comprising the steps of:
   (i) emulsifying water soluble amine in paraffin oil containing 0.5 to 10% w/w polymeric surfactant, optionally in presence of crosslinker or/and second amine followed by homogenization to obtain a homogenized mixture;
   (ii) adding 5 to 20% w/w polyisocynate to the homogenized mixture as obtained in step (i) at temperature in the range of 25-60° C. to obtain polyurea microcapsules; and
   (iii) treating the polyurea microcapsules as obtained in step (ii) with fumed silica in the range of 0.2 to 10% w/w based on total weight of microcapsules composition followed by treating with solvent to obtain microcapsules composition.

5. The process as claimed in claim 4, wherein the polymeric surfactant is polyester non-ionic surfactant.

6. The process as claimed in claim 4, wherein the crosslinker used is in the range of 5-50% w/w and selected from the group consisting of tetraethylene pentamine, triethylenetetramine (TETA), 2,4,4'-triaminodiphenylether, bis(hexamethylene triamine), 1,4,5,8-tetraamino anthraquinone, diethylene triamine (DETA), either alone or mixtures thereof.

7. The process as claimed in claim 4, wherein the polyisocynate is aromatic polyisocyanate or aliphatic polyisocyanate, wherein the aromatic polyisocyanate is selected from the group consisting of 2,4- and 2,6-toluene diisocyanate (TOI), naphthalene diisocyanate, diphenyl methane diisocyanate and triphenyl methane-p,p'p"-trityl triisocyanate, polymethylene polyphenylene isocyanate, 2,4,4'-diphenylether triisocyanate, 3,3'-dimethyl-4,4'-diphenyl diisocyanate, 3,3'-dimethoxy-4,4'diphenyl diisocyanate or triphenylmethane 4,4',4"triisocyanate, wherein the aliphatic polyisocyanate is selected from the group consisting of dicyclohexylmethane 4,4'-diisocyanate, hexamethylene 1,6-diisocyanate, isophorone diisocyanate (IPDI), trimethylhexamethylene diisocyanate, trimethylene diisocyanate, propylene-1,2-diisocyanate, butylene 1,2-diisocyanate either alone or mixtures thereof.

8. The process as claimed in claim 4, wherein the solvent used is selected from petroleum ether, hexane or mixtures thereof.

9. The microcapsule composition as claimed in claim 1, wherein the said composition is free of amine adduct or amine salt.

\* \* \* \* \*